United States Patent [19]
Lyberg

[11] Patent Number: 5,677,992
[45] Date of Patent: Oct. 14, 1997

[54] METHOD AND ARRANGEMENT IN AUTOMATIC EXTRACTION OF PROSODIC INFORMATION

[75] Inventor: Bertil Lyberg, Vagnhärad, Sweden

[73] Assignee: Telia AB, Farsta, Sweden

[21] Appl. No.: 329,865

[22] Filed: Oct. 27, 1994

[30] Foreign Application Priority Data

Nov. 3, 1993 [SE] Sweden .................. 9303623

[51] Int. Cl.$^6$ ...................... G10L 3/00
[52] U.S. Cl. ............ 395/2.66; 395/2.77; 395/2.86
[58] Field of Search ................. 395/2.4, 2.45, 395/2.48, 2.52, 2.55, 2.6, 2.63, 2.64, 2.66, 2.67, 2.7, 2.75, 2.77, 2.86

[56] References Cited

U.S. PATENT DOCUMENTS

| | | |
|---|---|---|
| 4,441,202 | 4/1984 | Tong et al. |
| 5,475,796 | 12/1995 | Iwata ............ 395/2.77 |
| 5,546,500 | 8/1996 | Lyberg ........... 395/2.77 |

OTHER PUBLICATIONS

S. Furui, "Synthesis and Recognition", *Digital Processing of Speech*, Marcel Dekker, Inc., 1989, pp. 69–70, 216–221.
R. Collier, "Intonation Analysis: The Perception of Speech Melody in Relation to Acoustics and Production", European Conference on Speech Communication and Technology, Eurospeech 89, 1989, pp. 38–44.

*Primary Examiner*—Fan Tsang
*Attorney, Agent, or Firm*—Oblon, Spivak, McClelland, Maier & Neustadt, P.C.

[57] ABSTRACT

The present invention relates to a method and arrangement for determining stresses in a spoken sequence. From a sequence recognized in the spoken speech, a model of the speech is created. By comparing the spoken sequence with the modelled speech, a difference between them is obtained. The difference is utilized partly for correcting the modelled speech and partly for determining stresses in the spoken sequence. After having determined the stresses in the speech, it is possible to determine the meaning of individual words and sentences in an unambiguous manner. This is then utilized in different contexts, for example when translating a first language to a second language whilst retaining meaning and intonation. The invention can also be used in verbal man-to-machine communication.

10 Claims, 2 Drawing Sheets

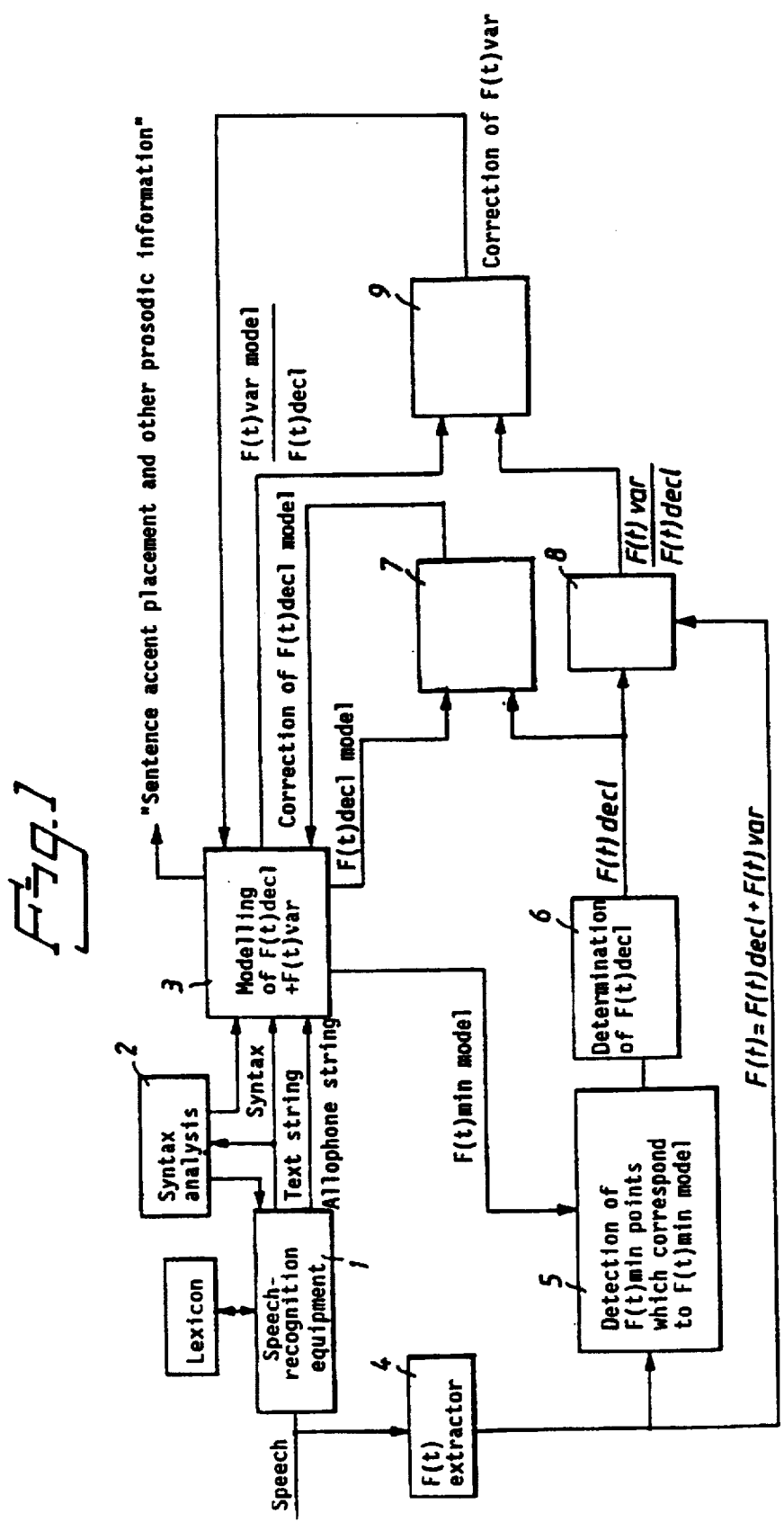

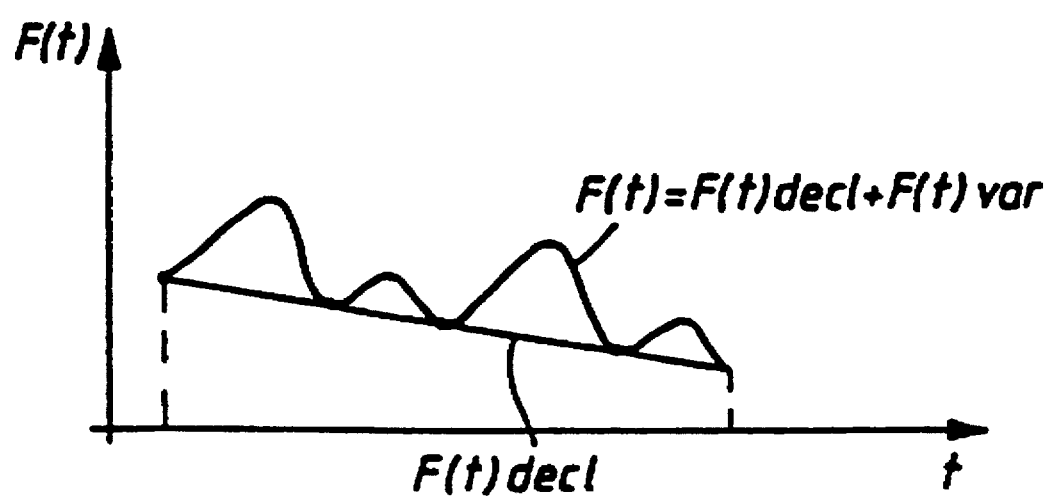

5,677,992

METHOD AND ARRANGEMENT IN AUTOMATIC EXTRACTION OF PROSODIC INFORMATION

TECHNICAL FIELD

The present invention relates to artificial analysis of speech. The invention is directed towards establishing, by means of correct analysis, stresses, made by a speaker, of words and sequences in a sentence. By means of the analysis, the invention permits understanding of the speech to be increased and, at the same time, accentuations in the speech can be reproduced.

The present invention makes it possible for artificial translation from one language to another language to be given a correct reproduction. Furthermore, stresses in the original language can be reproduced in the second language.

STATE OF THE ART

In the production of artificial speech, words and sentences are assembled from a library. Stresses, to the extent to which they occur, are inserted in accordance with standards determined in advance. This implies that the sound in some cases is experienced to be mechanical or in some other way non-human. To the extent to which it has been attempted to solve the problem, analysis methods have been utilized which require large computer power. Those methods and arrangements which have emerged in this context, however, are found to be mainly useful within limited areas of application using predetermined phrases. Methods for assembling arbitrary sequences into interpretable information are lacking.

In the analysis of speech, arrangements are utilized which can distinguish certain words or phrases. In this case, the person who pronounces the words or phrases must say only the phrase or the word. The machine which analyzes the replies experiences problems with understanding different dialects, and also if the speaker is clearing his throat or is hoarse, or if the surrounding sound is strong and affects the analysis, and so forth.

In the analysis of speech, the speech-recognizing equipment is imprinted for a number of persons in order to achieve a high degree of recognition.

DESCRIPTION OF THE INVENTION

Technical Problem

In connection with artificial reproduction of a spoken language, there is need for the language to be reproduced naturally and with the correct accentuation. In automatic translation of a speech into a second language, the accentuations are of decisive significance in performing the translation. The meaning of a word can thus have widely different meanings depending on the stress. In other situations, the meaning of one and the same sentence can be given a different significance depending on where the stress is placed. Substantial effort has been expended in this field. Furthermore, the stressing of sentences and parts of sentences determines sections which are emphasized in the language. There is a need for these emphases to be reproduced in the second language in a correct manner. No methods are known which solve the problem in this respect, either.

In other contexts, it is desirable for speech which is produced purely artificially to be reproduced naturally with the correct accentuation. This situation exists in the increasing range of machines which produce speech in various contexts. The speech produced by machines today is, for many people, difficult to understand and difficult to interpret. There is thus a strong requirement to find methods and arrangements which produce speech which is interpretable by most people. The fact that people see machine-produced speech as difficult to understand results in there being resistance to such arrangements. There is thus a need for reducing this resistance.

In translation from and to languages with well-developed sentence accent stress and/or pitch in individual words, identification of the actual meaning of the word/sentence is very difficult. There is also difficulty when translation is to be carried out into these languages, as a consequence of difficulties in giving the right stresses. The fact that stresses can be incorrectly placed increases the risk of misinterpretation or that the meaning is completely lost for the listening party.

In controlling and directing different systems, there is a need to utilize the spoken word. Examples of such areas are, for example, the increasing range of services which are being introduced in different telecommunication networks. To utilize the services, the user must currently use different codes. It is possible to remember a small number of simple codes but if a prerequisite of the codes is that certain additional information should be fed in, the picture becomes complicated. In these cases, one is forced to have available some form of reminder note or the like. In certain cases, one believes perhaps that one can remember the code and the input order for different information. If the inputting takes place incorrectly, times or the date, for example, can be wrong. Normally, no confirmation is obtained that the system has received the information correctly. If the receiving system could receive the information verbally, the users, the subscribers, would be able to utilize services and other functions in a more effective way. It is easier to remember services verbally in a telephone network, for example, than to remember a special numerical code. There is also resistance to the utilization of such services in, for example, a telephone network, if the coding is troublesome.

When controlling in, for example, a telephone network or a traffic system, giving a verbal order to mechanical or electronic systems implies a considerable relief for the operators. Currently, operators utilize inputting of information via keyboards or the like. In such inputting, the time is much longer than if verbal orders can be utilized.

Utilization of the spoken word for giving orders to different systems is definitely a desirable feature in many fields apart from those discussed above.

The present invention is intended to solve the problems discussed above.

Solution

The present invention relates to a method and arrangement for determining stresses in a spoken sequence. From a sequence recognized in the spoken speech, a model of the speech is created. By comparing the spoken sequence with the modelled speech, a difference between them is obtained. The difference is utilized partly for correcting the modelled speech and partly for determining stresses in the spoken sequence. After having determined the stresses in the speech, it is possible to determine the meaning of single words and sentences in an unambiguous way. This is thereafter utilized in different connections, for example in translating a first language into a second language, while retaining meaning and intonation. The invention can also be used in verbal man-to-machine communication.

The invention thus relates to a method for determining stresses in the speech from a spoken sequence. A model of the spoken sequence is formed. The model is compared with the spoken sequence, whereby a difference between them is obtained. The difference affects the model, which is then corrected so that it better corresponds to the spoken sequence. This makes it possible to determine the stresses in the speech.

In a development of the invention, the fundamental tone and variation of the spoken sequence and the modelled speech are determined. The ratio between the respective fundamental tone and variation is formed. The ratios are then compared with one another. The difference found between the ratios affects the model, which is corrected so that it better corresponds to the spoken sequence. Furthermore, sentence accent placements can be derived from the difference between the ratios.

Relative sentence stresses are determined by classifying the ratio between variation and declination of the fundamental tone, whereby emphasized sections or individual words can be determined.

Furthermore, the pitch of the speech can be determined from the declination of the fundamental tone.

The arrangement includes a first element which extracts the fundamental tone of the speech. In addition, an artificial speech is produced in a second element. The fundamental tones of the spoken sequence and the artificial speech are determined and compared with one another. The difference found then affects the second element, whereby the artificial speech is corrected. Furthermore, stresses in the spoken sequence are determined on the basis of this.

The first element also determines a first ratio between the variation and declination of the fundamental tone of the spoken sequence. The second element produces, besides the artificial speech, a second ratio between the fundamental tone and declination of the artificial speech. The third element compares the said first and second ratios. A difference is formed, whereby sentence accent placements can be determined.

The third element classifies the ratio between the variation and declination of the fundamental tone. By means of the classification, the element determines relative sentence stresses and emphasized sections or words.

From the check, by the third element, of the declination of the fundamental tone, the pitch of the speech is determined.

The relationship between the variation and declination of the fundamental tone is utilized by the third element for determining the dynamic range of the fundamental tone of the speech.

Advantages

The invention allows the spoken word to be utilized to what is now an increased extent. It is thus possible to order systems to change functions using verbal commands. In the telephony system of today, for example, the subscriber is given the possibility of controlling services of different types by means of giving commands using the voice.

In situations where one language is being translated to another language, the invention provides an increased possibility of obtaining a correct translation of words. For example, it is found that similarly sounding words with different stresses have widely different meanings in certain languages. The possibility of distinguishing between these words is provided by the invention in that accentuations can be determined. Furthermore, sentence accent stresses can change the meaning or significance of a sentence. Due to the fact that the invention can determine these latter, the correct meaning can be obtained in translating to another language. Furthermore, the possibility is provided for sentence accent placements or stresses on certain words in a first language to be given corresponding placement in a second language on translation.

In other situations where a vocal response is obtained from machines, it is possible to obtain a natural speech, which increases understanding due to the fact that the stresses are natural. This results in man-machine communication being possible in a natural manner which is not experienced by people to be artificial.

DESCRIPTION OF THE FIGURES

FIG. 1 shows a block diagram of the invention.

FIG. 2 shows a diagram with the fundamental tone declination drawn in and a fundamental tone superimposed on the fundamental tone declination.

PREFERRED EMBODIMENT

In the text which follows, the concept of the invention is described with reference to the figures and designations therein.

A spoken sequence, speech in FIG. 1, is fed into the system. The speech is received in a speech-recognition equipment 1 wherein a text string is recognized. The speech recognition utilizes a lexicon connected to the speech-recognition equipment. The speech-recognition equipment generates a text string and an associated allophone string with lexical stresses.

In the sentence analyzer 2, the syntactic structure of the text string is analyzed. This information and the text string and the allophone string are fed into a modelling unit 3. From the information fed in, the fundamental tone is modelled as $F(t)=F(t)decl+F(t)var$, where $F(t)decl$ is the declination of the fundamental tone and $F(t)var$ is the variation of the-fundamental tone. This implies that the modelled fundamental tone is made up of the variation of the fundamental tone superimposed on the declination of the fundamental tone. FIG. 2 shows the significance of this construction. The fundamental tone is also extracted from the text string in the fundamental tone extractor, 4. Then the minimum points of the fundamental tone are detected, 5. The minimum points of the fundamental tone correspond segment by segment to the minimum values which are generated by the fundamental tone model generator, 3. From the minimum values of the fundamental tone, the declination of the fundamental tone of the sentence is determined, 6. The declination of the fundamental tone, determined in 6, is then compared in 7 with the declination of the modelled fundamental tone from 3. A difference is formed between the declination of the fundamental tone and the declination of the modelled fundamental, tone. The difference generated is fed back to the model generator, 3. In the model generator, the difference is utilized for generating a correction of the modelled signal. The declination of the fundamental tone, which was generated in 6, is transferred to 8. The fundamental tone, which consists of the declination of the fundamental tone to which the variation of the fundamental tone is added, is transferred from the fundamental tone extractor, 4, to 8. The variation of the fundamental tone is then determined by subtracting the declination of the fundamental tone, which was determined in 6, from the fundamental tone. Then the ratio is formed between the variation of the fundamental tone and the declination of the fundamental tone, which value is supplied to 9. This expression is independent of the pitch position of the speaker. A ratio is also formed between the variation and declination of the modelled fundamental tone. A difference is formed between the said ratios. The difference is fed back to the model generator, 3. After that, the parameter values in the modelling are affected and the declination and variation of the fundamental tone in the model are corrected. Sentence accent placements are also obtained on optimization by the sentence accent being allowed to pass through possible sentence accent placements in the sentence. By classifying the ratio between the variation and declination of the fundamental tone, in the sentence accent placements obtained, the relative sentence stresses are determined in the sentence and the words emphasized by the speaker are obtained. By determining the declination of the fundamental tone, the pitch of the speaker can also be classified. Furthermore, the deviation in the variation in the fundamental tone in relation to the declination of the fundamental tone specifies the dynamic range of the fundamental tone of the speaker.

The invention is not limited to the embodiment shown above but can be subjected to modifications within the scope of the subsequent claims and the concept of the invention.

I claim:

1. A method for determining sentence stresses from speech, comprising the steps of:

receiving a real speech signal;

forming an artificial speech signal;

selecting a section of said artificial speech signal in which a sentence stress is expected to be placed;

comparing the artificial speech signal with the real speech signal, comprising differencing said section of said artificial speech signal with said real speech signal to obtain a difference;

adjusting said artificial speech signal based on said difference so as to more accurately approximate said real speech signal; and determining stresses corresponding to said real speech signal based on said difference.

2. The method according to claim 1, wherein said comparing step comprises the steps of:

forming a real speech ratio between a variation and a declination of a fundamental tone of said real speech signal;

forming an artificial speech ratio between a variation and a declination of a fundamental tone of said artificial speech signal; and differencing the real speech ratio and the artificial speech ratio to obtain said difference.

3. The method according to claim 2, wherein said determining step comprises the steps of:

classifying said real speech ratio of variation and declination of a fundamental tone of said real speech into at least one class of a set of at least two classes; and determining relative sentence stresses of at least one of an emphasized section and a word in said real speech based on how said real speech ratio is classified in said classifying step.

4. The method of claim 1, wherein said determining step comprises determining a pitch of the real speech based on a declination of a fundamental tone of said real speech.

5. The method of claim 1, wherein said determining step comprises determining a dynamic range of said real speech based on a relation between a variation and a declination of a fundamental tone of said real speech.

6. A system for automatically extracting prosodic information from speech, comprising:

a speech recognition mechanism that extracts a real fundamental tone of real speech input thereto;

an artificial speech generator that generates an artificial speech having an artificial fundamental tone, comprising, a placement mechanism that places a sentence stress in a section of said artificial speech signal expected to coincide with a corresponding stress in said real speech signal, and a difference mechanism that determines a difference between said section of said artificial speech signal and said real speech signal; and a determination mechanism that determines a stress position in said real speech signal based on said difference.

7. The system of claim 6, wherein:

said speech recognition mechanism comprises a first ratio determination mechanism that determines a first ratio between a variation and a declination of a fundamental tone of said real speech signal;

said artificial speech generator comprises a second ratio determination mechanism that determines a second ratio between the fundamental tone and a declination of the artificial speech signal; and said determination mechanism is configured to determine said stress position based on a difference between said first ratio and said second ratio.

8. The system of claim 7, wherein said determination mechanism comprises a classification mechanism that classifies the first ratio into one class of plural classes so as to determine said stress position of at least one of an emphasized section and a word in said real speech signal.

9. The system of claim 6, wherein said determination mechanism comprises a pitch determination mechanism that determines a pitch of the real speech signal from a declination of the real fundamental tone of the real speech signal.

10. The system of claim 6, wherein said determination mechanism comprises a dynamic range determination mechanism that determines a dynamic range of the real fundamental tone of said real speech signal based on a variation and a declination of said real fundamental tone.

* * * * *